US006282266B1

(12) United States Patent
Przyblyski et al.

(10) Patent No.: US 6,282,266 B1
(45) Date of Patent: Aug. 28, 2001

(54) CONCENTRATED DYNAMIC TEST PATH ROOTING

(75) Inventors: John Przyblyski, Sebastopol; Thomas Riekert; Rebeca Marthinsen, both of Novato, all of CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/998,120

(22) Filed: Dec. 24, 1997

(51) Int. Cl.[7] .............................. H04M 1/24; H04M 3/08; H04M 3/22

(52) U.S. Cl. ............................. 379/27; 379/16; 379/17; 379/29

(58) Field of Search ....................... 379/1, 3, 5–6, 379/22, 26–29, 30, 34; 370/241–242, 244, 247–248, 249–250, 251–252; 324/522–523, 525, 527, 533

(56) References Cited

U.S. PATENT DOCUMENTS 5,920,609 * 7/1999 Toumani et al. ..................... 379/29
5,937,033 * 8/1999 Bellows ................................ 379/27

\* cited by examiner

Primary Examiner—Duc Nguyen
(74) Attorney, Agent, or Firm—Jackson Walker L.L.P.

(57) ABSTRACT

A system in accordance with the invention dynamically establishes test connections upon initiation of a test sequence and does not need to maintain permanently "nailed up" test connections. To do so, each node in the system, e.g., COT, RT, maintains a logical bypass pair terminator ("BT"). The BT includes facilities which reserve the requisite channels that will be needed to establish a test connection. When a test sequence is initiated for testing a drop from an RT, a BT facility at the RT will establish a connection to an RT bypass card and a BT facility at the COT will establish a connection to a COT bypass card, thereby completing the test connection.

20 Claims, 7 Drawing Sheets

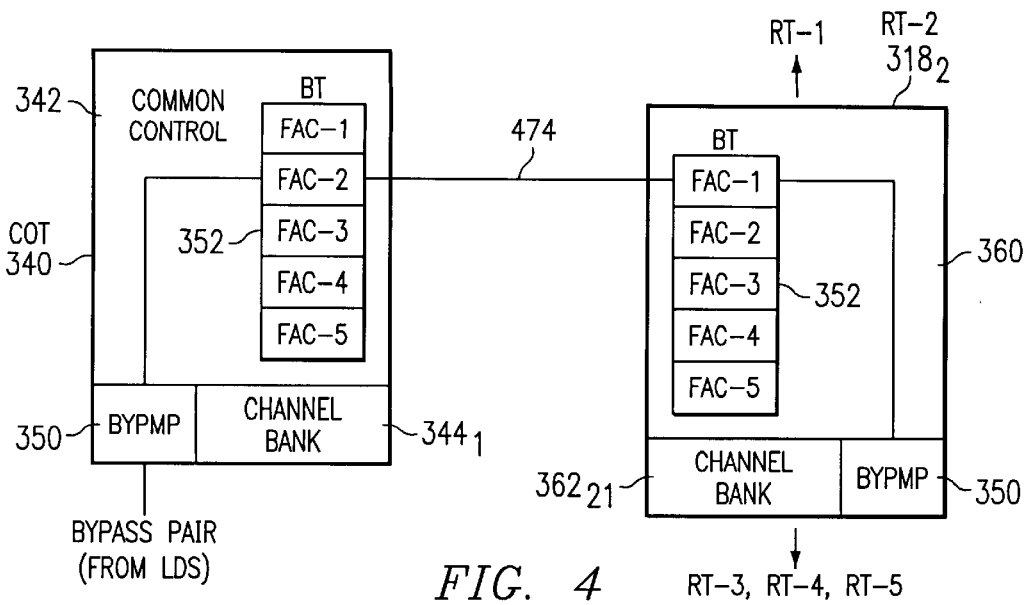
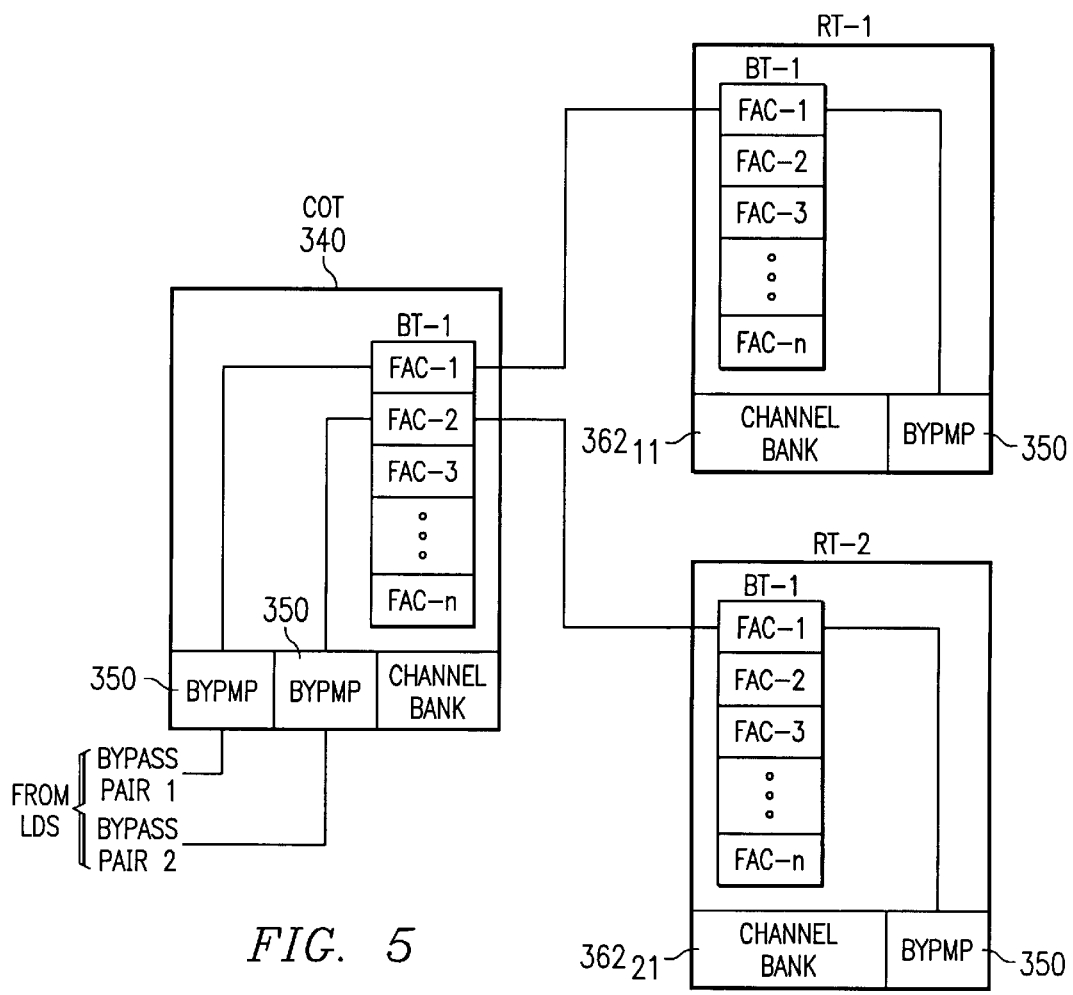
FIG. 4
FIG. 5

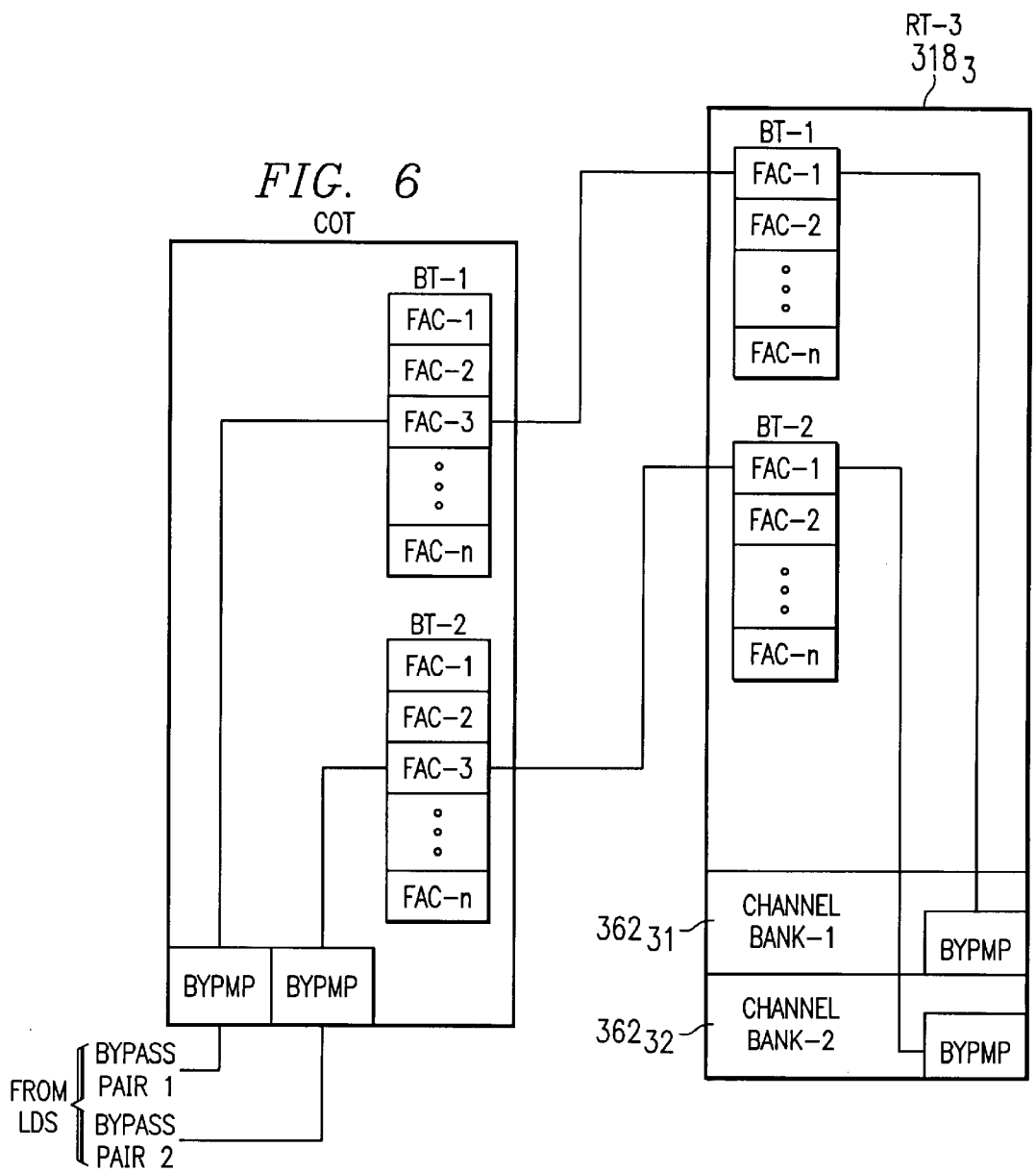

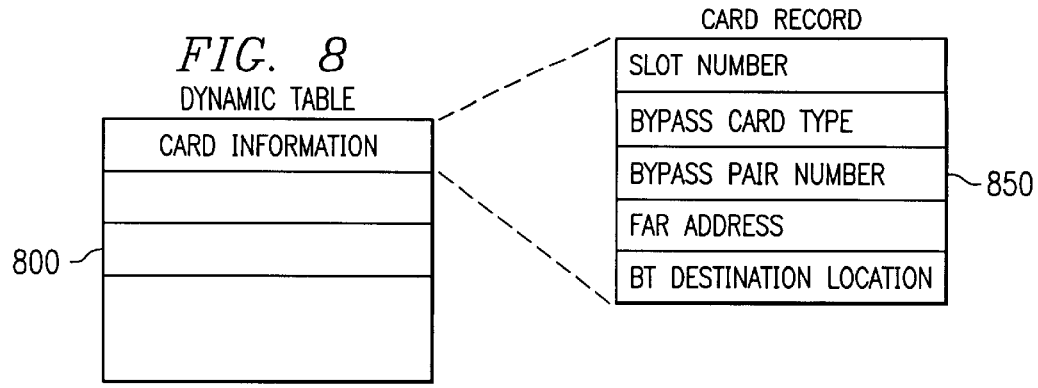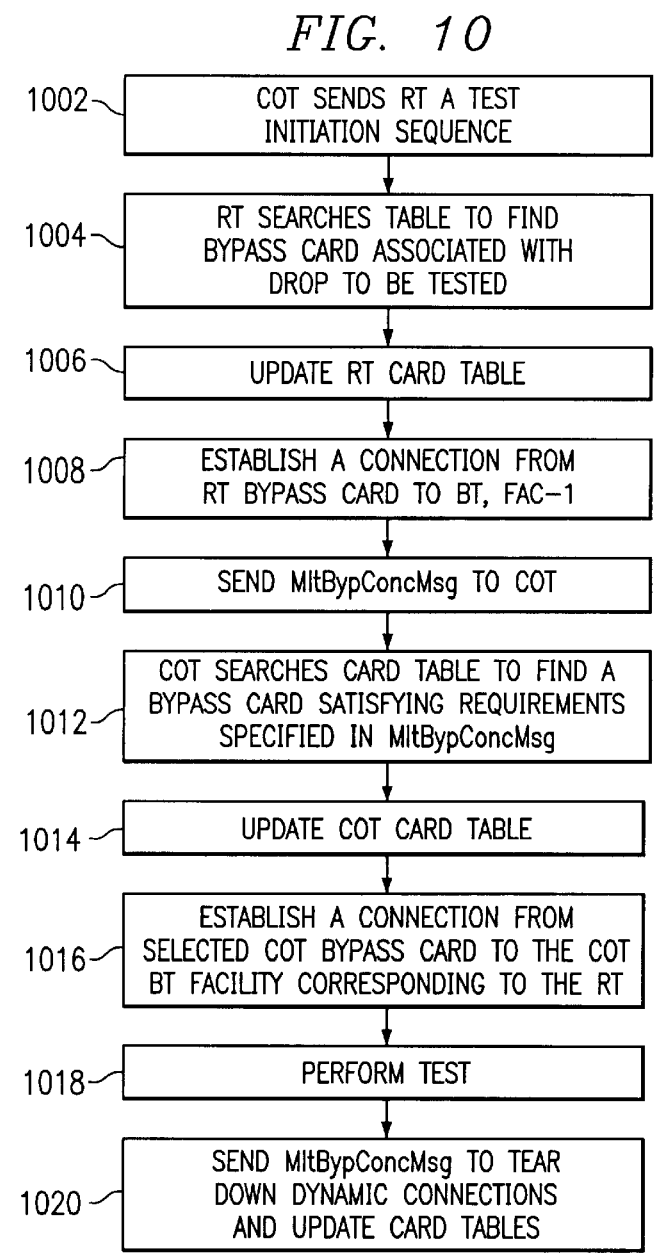

ically be "perceive" a copper

CONCENTRATED DYNAMIC TEST PATH ROUTING

FIELD OF THE INVENTION

The invention generally relates to telecommunication service and specifically, the invention relates to testing, performed at a central office, of "drops" at a remote terminal for individual subscriber service.

BACKGROUND

Years ago, telecommunications companies provided service to their subscribers strictly by copper wire. Within the recent decades, however, telecommunications companies have been gradually replacing much of the copper wire with optical fiber. Optical fiber permits a greater capacity of signals to travel further with considerably less degradation than when using copper wires.

The block diagram of FIG. 1 shows generally a communication system that does not include fiber. A central office (CO) 110 provides, through local digital switch (LDS) 112, subscriber service on communication path 114 to a remote terminal (RT) 118. A number N of RTs $118_n$ (n=1 ... N) can be coupled to the switch 112 via a respective communication path $114_n$. Each communication path $114_n$ includes T1 lines, i.e., lines capable of carrying signals according to the DS1 signaling standard for transmission at 1.544 Mbps. A T1 facility can support 24 simultaneous DS0 channels, where DS0 is a standard for transmission (64 Kbps) for PCM digitized voice channels and is well known in the art.

The RTs each respectively contain a number of different cards including "plain old telephone service" ("POTS") cards 122, which are each in turn coupled to a respective subscriber's home or office to provide telephone or other communication service. The connection 124 between a respective POTS card 122 and the subscribers location is often referred to herein as a "drop." Each drop is composed of a "tip" line and "ring" line. POTS cards can often support more than one drop.

Often, the telecommunication service provider (e.g., a telephone company) will need to test an individual "drop" from the RT $118_n$ to the individual subscriber's location. Rather than having to go to each subscriber's location, equipment is provided at the CO to enable remote testing of drops, including a "mechanized loop test" (MLT) unit 130. The MLT 130 has a number of DC test pairs 132, formed of copper, coupled between the MLT 130 and switch 112. While two test pairs 132 are shown in FIG. 1, one or more test pairs are often provided. In addition, dedicated test lines, referred to herein as "bypass pairs" and also formed of copper, are coupled between the CO 110 and the RTs such that each RT $118_n$ receives its own respective bypass pair $134_n$. The switch 112 switches to couple a DC test pair to a bypass pair such that only a single RT unit is coupled to the respective DC test pair at a given time.

Tests are performed under control of the MLT 130. Generally, to initiate a test, first switch 112 directs that 130 volts be placed on the tip line of the individual drop to be tested via its respective POTS card. This 130 volts informs the selected POTS card in the RT that its drop is about to be tested. The POTS card then redirects its connection from the communication path $114_n$ to the bypass pair coupled to the RT. Then the MLT 130, having been electrically coupled to the drop to be tested via the appropriate bypass pair $134_n$ and switch 112, takes appropriate electrical measurements over the drop under test (e.g., by placing a voltage or current on the bypass pair $134_n$).

The telecommunications industry has gradually been replacing many of their copper wire connections with optical fiber, and particularly those connections between the CO and the RTs. Referring to the block diagram of FIG. 2, central office 210 is coupled to each of N RT units $218_n$, n=1 ... N, via a communication path $216_n$ formed of optical fiber. (In one implementation currently provided by DSC Communications Corporation, N≦5). The communication path $216_n$ carries signals according to the SONET standard of optical network transmission as is known in the art. In the CO 210, a local digital switch 212 and MLT 230 are still present and coupled to one another, the MLT 230 providing DC test pairs 232 to the LDS 212. However, rather than being directly connected to each RT via copper lines, the switch 212 is coupled with copper T1 lines 214, that are capable of carrying signals in accordance with DS1 or DS0, to a central office terminal (COT) 240. The COT is then coupled to each RT via fiber communication paths $216_n$. The COT 240 also receives one or more bypass pairs 234, formed of copper wire, from LDS 212.

Despite the use of fiber paths $216_n$, MLT 230 as used by most telecommunication service providers is the same MLT used when a copper wire connection was formed between the central office and each RT unit. Since the MLT 230 cannot take measurements over fiber (it can only take electrical measurements), testing the individual drops becomes difficult when fiber is installed. Thus, equipment has been developed to mimic copper signals over the fiber path, enabling switch 212 to essentially "perceive" a copper bypass pair from the central office to each RT and to allow the POTS cards at each RT to essentially "perceive" the switch 212 as if coupled with copper wire. This equipment includes COT 240, mentioned above.

The COT 240 includes a common control unit 242 as well as one or more card banks $244_m$, m =1 ... M. In one implementation currently provided by DSC Communications Corporation, M≦9. Common control unit 242 provides hardware, firmware, and/or software needed to interface the copper lines 214 and bypass pairs 234 from the LDS 212 to optical fiber paths $216_n$. Each card bank within the COT 240 can also be one of a variety of types, e.g., a channel bank, a fiber bank, or the like. In FIG. 2, each of the card banks $244_m$ in the COT is shown as a channel bank. Card banks $244_m$, each include slots for housing various line cards. In one implementation, each channel bank includes 56 line card slots. In the case of a channel bank, e.g., $244_M$, line cards may include POTS cards 246 coupled to a drop 248.

Each RT unit $218_n$ also includes a common control unit 260, which is similar in many respects to common control unit 242 in COT 240. Each RT $218_n$ also includes a plurality of card banks $262_{1k}$, $262_{Np}$ (k=1 ... K, p=1 ... P), where the subscript for each card bank 262 identifies first the RT number and then the bank number ($262_{(RT\#)(bank\#)}$). The number (K, P) of card banks $262_{1k}$, $262_{Np}$ in each RT $218_n$ can vary, although in one implementation, K, P≦9. Each card bank within each RT can also be one of a variety of types: the card banks can be either channel banks, fiber banks, or the like. For example, in FIG. 2, RT-1 $218_1$ is shown to contain one card bank $262_{11}$, which is a channel bank. Channel bank $262_{11}$ includes a number of line cards, including POTS cards 247 which are each coupled to a drop 224. RT-N $218_N$, however, includes P card banks $262_{Np}$, where at least one of the banks $262_{Np}$ is a channel bank, housing POTS cards 247, and at least one of the banks is a fiber bank $262_{N1}$.

A fiber bank, e.g., $262_{N1}$, includes a number of fiber cards (not shown), which convert electrical signals to optical signals and vice versa. Each card in the fiber bank $262_{N1}$ is coupled to an optical network unit (ONU) $270_q$, q=1. Q, via a fiber connection. As they receive optical signals, ONUs $270_q$ are generally used to provide telecommunication services to subscribers that are located too far away from the RT to receive reliable service over copper lines. Each ONU $270_q$ includes a fiber card (for converting optical signals into electrical signals and vice versa, not shown) and a number of POTS cards 247 each coupled to a respective drop 224. Each fiber bank, e.g., $262_{N1}$ can have a plurality of ONUs coupled to it, and in one implementation 16 ONUs can be coupled to a fiber bank such as $262_{N1}$. Thus, in a system where nine card banks can be included in an RT, and if all card banks are fiber banks, then up to 144 ONUs can be coupled to a single RT.

In order to mimic the bypass pairs for testing purposes, line cards 250, referred to as bypass cards (BYPP cards), are supplied. The bypass cards are deployed in pairs: one is provided in a channel bank $244_m$ at the COT 240 and a companion card is provided at a channel bank of an RT $218_n$. The bypass cards at the COT translate MLT signals, received via a bypass pair 234, into optical signals (signals that can be sent over fiber) and translate optical signals received from the communication path $216_n$ into electrical signals that can be used by the switch 212. Similarly, bypass cards at the RT translate optical signals received from communication path $216_n$ into electrical signals that can be used by the drops 224 and vice versa. Once pairs of bypass cards are deployed, a connection between the pair is then permanently "nailed up" across the SONET connection. In other words, when deployed, a connection between the pair of BYPP cards is established and will permanently exist. A "nailed up" connection between a pair of BYPP cards is represented in FIG. 2 with dashed line 272. Each "nailed up" connection between BYPP cards 250 is composed of a pair of DS0 channels.

Although not shown in FIG. 2, each bypass card 250 in the COT is coupled to a bypass pair 234. Each bypass pair 234 may be coupled to more than one bypass card 250.

In order to test all the drops 224 from the RTs $218_n$, each set of channel banks in each RT $218_n$ receives at least one BYPP card 250. Since the BYPP cards 250 are deployed in pairs, for every BYPP card in an RT, there is a corresponding BYPP card at the COT 240. Thus, if five RTs are coupled to the COT, and each RT includes nine channel banks each respectively containing a BYPP card, then 45 BYPP cards will be required to be installed in the COT channel banks. Since each channel bank at the COT has only a limited number of slots, e.g., 56, additional channel banks will usually be necessary to support line cards for subscriber services. Moreover, each pair of BYPP cards (one card located at the COT and a second card located at an RT) has a "nailed up" connection between them. Thus, BYPP cards will take up slots and bandwidth that could otherwise be used for subscriber service. Yet, despite the use of considerable COT and bandwidth resources, testing is infrequent.

The problem becomes magnified with the use of ONUs $270_q$. While only one BYPP card 250 is needed per set of channel banks in each RT unit, BYPP cards cannot be installed in fiber banks to support testing of ONUs connected to that fiber bank. Rather, each ONU receives its own BYPP card. Since a relatively large number, e.g., 144, ONUs can be supported by any one node, companion cards at the COT 240 for each ONU $270_q$ and permanent "nailed up" connections between them will also have to be provided. Thus, considerable space will be dedicated to BYPP cards 250 at the COT, which can only accommodate a limited number of channel banks (e.g., 9). For instance, if all 144 ONUs are supported off of an RT, approximately three channel banks (where each contains 56 slots), or ⅓ of the COT resources, will be dedicated to test functions that are infrequently performed.

Therefore, existing alternatives to copper bypass pairs are becoming prohibitively expensive and wasteful of system resources (e.g., card slots and bandwidth). The ability to test drops according to these alternatives requires establishing and maintaining distinct connections between each COT BYPP card and a respective RT BYPP card, whether or not a test is in progress.

SUMMARY OF THE INVENTION

In order to overcome the deficiencies discussed above, a system is disclosed that allows the dynamic establishment of test connections between a central office terminal (COT) and a remote terminal (RT) connected via a fiber communication path. Such a system minimizes the number of permanently "nailed up" connections over the fiber path by utilizing a pre-provisioned connection between the COT and each RT in conjunction with dynamic routing to establish a complete test connection only upon initiation of a test sequence.

In one embodiment of the invention to dynamically establish test connections, bypass cards are provided in each channel bank and/or ONU having a drop that will at some time need to be tested. However, a corresponding bypass card for each bypass card deployed in the RTs and/or ONUs is not required at the COT. Rather only one bypass card is required to support testing. Some embodiments, however, can provide more than one bypass card to support simultaneous testing of distinct drops.

In addition, a bypass pair terminator (BT) is supplied in each node, e.g., each COT and RT. A BT is a logical entity that is composed of a plurality of facilities in one embodiment of the invention. Each facility is composed of two DS0 channels. A pre-provisioned test path through the fiber communication path is established and maintained between a respective BT facility in the COT and a respective BT facility in each RT coupled to the COT. Thus, when no test is in progress each BT facility reserves specified DS0 channels for use in test (i.e., the pre-provisioned path).

Upon initiation of a test sequence, a connection is established from a BT facility in the RT to a bypass card in the RT. In addition, the COT will establish a connection from the appropriate facility in its BT to a bypass card in the COT, thus completing establishment of the test connection. After test completion, the respective connections from the BTs to the bypass cards are torn down. As used herein, a "connection" can occur physically in hardware, can occur logically through software and/or firmware, or can occur through a combination of hardware, software and/or firmware.

Using a system in accordance with the invention minimizes waste of system resources in terms of bandwidth since a complete test connection is not established until a test is to be conducted, maximizing use of the fiber path for normal subscriber service. Further, only a few bypass cards will be necessary at the COT to fully support test of all of the drops from a plurality of RTs and ONUs, minimizing use of system resources for test in terms of line card slots at the COT.

BRIEF DESCRIPTION OF THE DRAWINGS

The invention will be described with respect to particular embodiments thereof, and reference will be made to the drawings, which are not necessarily drawn to scale, and in which:

FIG. 4 is a generalized block diagram showing a dynamically established test connection between an RT-2 and a COT in accordance with the invention;

FIG. 5 is a generalized block diagram showing two dynamically established test connections in accordance with the invention;

FIG. 6 is a generalized block diagram also showing two dynamically established test connections in accordance with the invention;

FIG. 7 is a generalized block diagram of a BT data structure in accordance with the invention;

FIG. 8 is a generalized block diagram of a dynamic table and a card record within the table in accordance with the invention;

FIG. 9 is a generalized block diagram of a message sent for dynamically establishing a test connection in accordance with the invention; and FIG. 10 is a flow diagram illustrating a method of establishing a test connection in accordance with the invention.

DETAILED DESCRIPTION

A system in accordance with the invention dynamically establishes test connections upon initiation of a test sequence and does not need to maintain permanently "nailed up" test connections to each bypass card. To do so, each node in the system, e.g., COT, RT, maintains a logical bypass pair terminator ("BT"). In one embodiment, up to four BTs can be provided in each node. Each BT includes facilities which reserve the requisite channels that will be needed to establish a test connection. When a test sequence is initiated for testing a drop from an RT, an appropriate BT facility at the RT will establish a connection to an RT bypass card and an appropriate BT facility at the COT will establish a connection to a COT bypass card, thereby forming a complete test connection. More specific details are described below.

Figure 1:
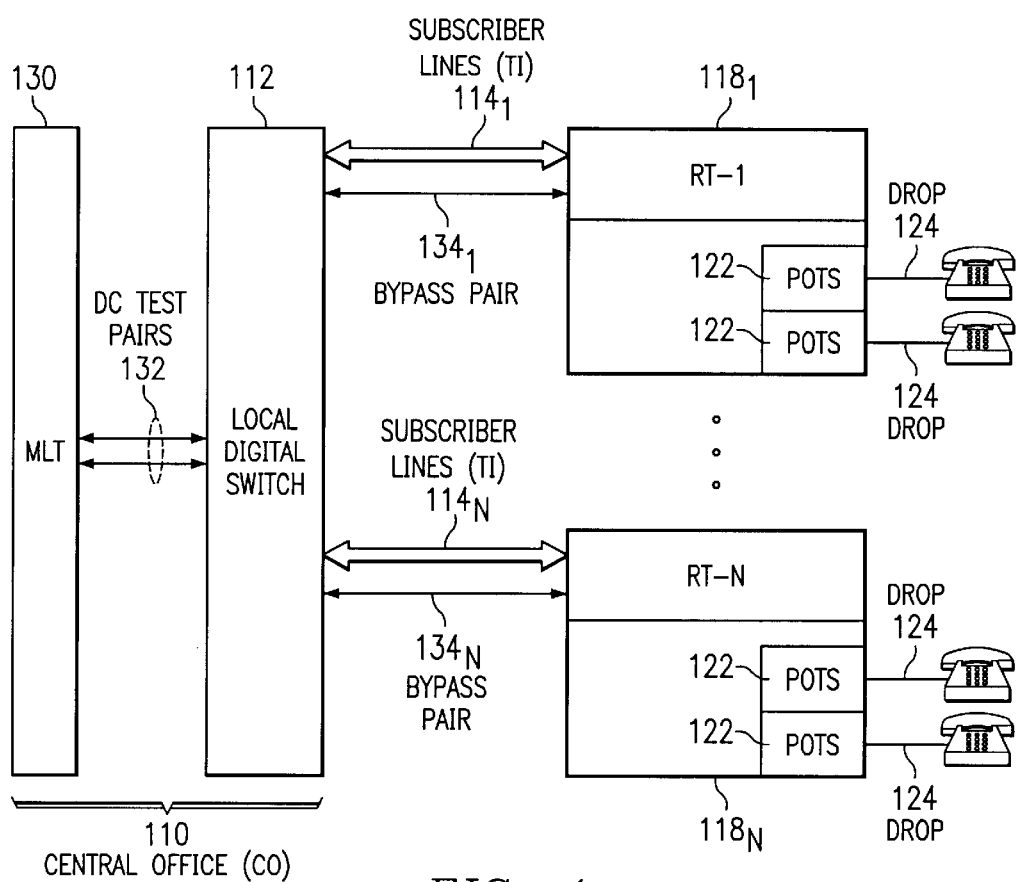
FIG. 1 is a generalized block diagram of a system using copper wire to form connections between the central office and RTs.
Figure 2:
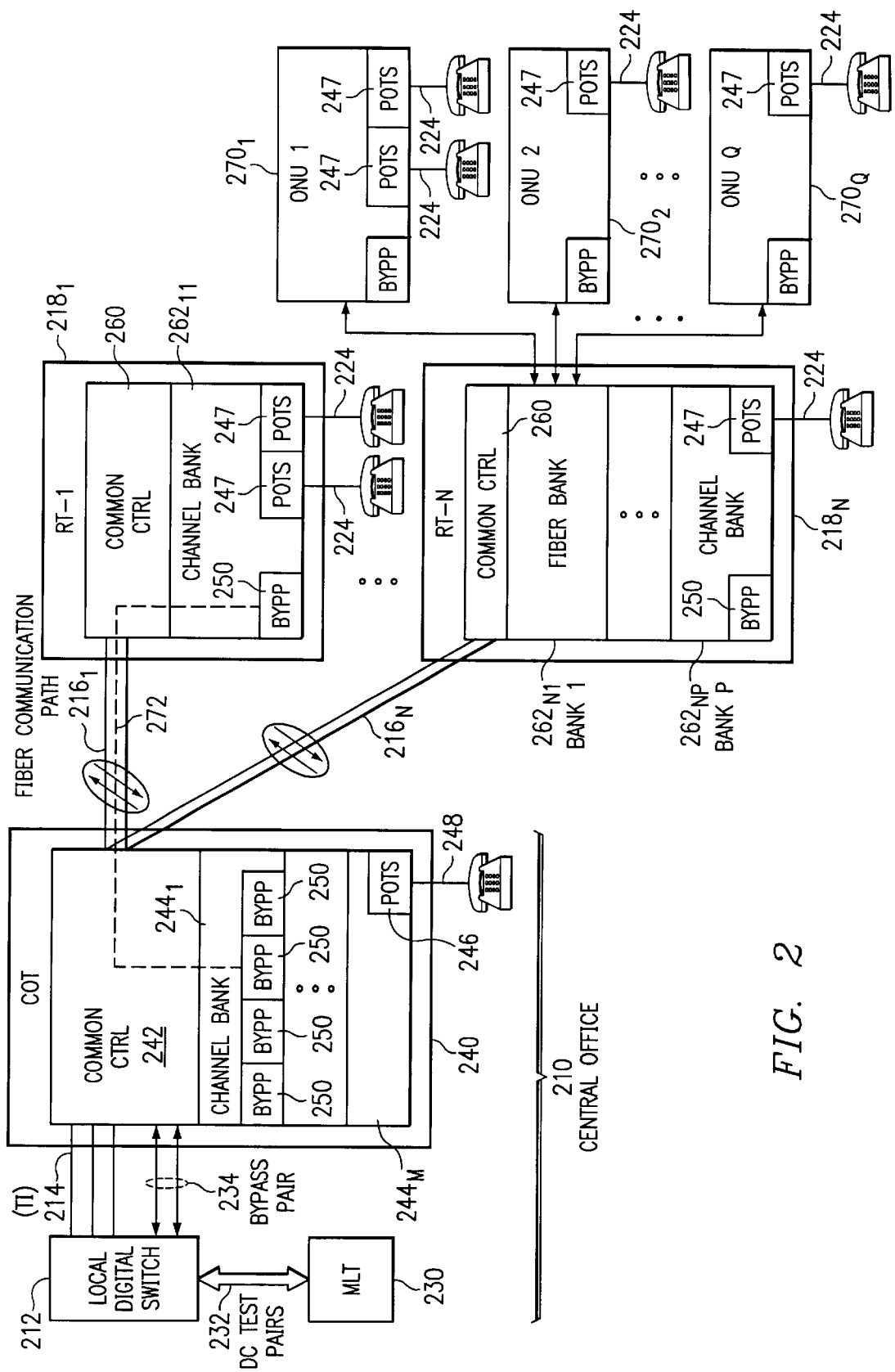
FIG. 2 is a generalized block diagram of a system that includes a fiber communication path between the central office and RTs and that utilizes a system of permanently "nailed up" test connections between bypass cards.
Figure 3:
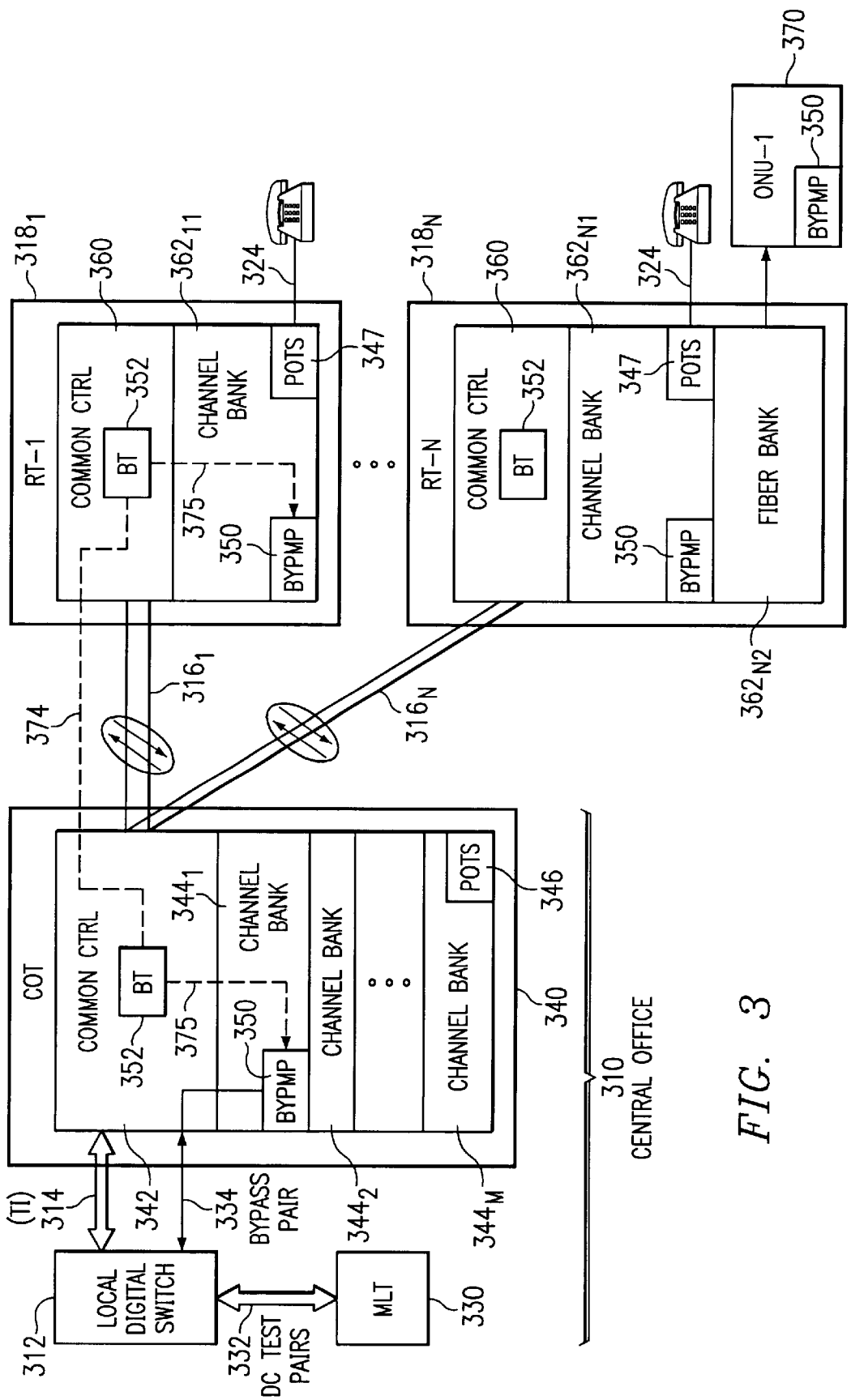
FIG. 3 is a generalized block diagram of a system in accordance with the invention.

FIG. 3 shows a block diagram of a system in accordance with the invention. Like the system of FIG. 2, CO 310 includes a local digital switch (LDS) 312 coupled to an MLT test unit 330 with DC Test pairs 332. LDS 312 is coupled to COT 340 via copper lines 314 capable of carrying DS0 or DS1 signals for subscriber service and at least one bypass pair 334. In some embodiments of the invention more than one bypass pair 334 is provided, e.g., two or four bypass pairs. The COT 340 is then coupled to each of N RTs $318_n$ via fiber communication paths $316_n$. In one embodiment of the invention N≦5, although N can be greater than five in other embodiments.

COT 340 includes common control unit 342, which provides the hardware, firmware, and/or software needed to mimic copper lines, i.e., interface the copper T1 lines and bypass pair 334 with optical fiber paths $316_n$. COT 340 further includes M card banks $344_m$, where in one embodiment M≦9, although other embodiments could have more than 9 card banks. Each card bank includes a number of slots, e.g., 56 in one embodiment, to house line cards. In particular, when card bank $344_m$ is a channel bank (as opposed to a fiber bank), the card bank will house line cards that may include POTS cards 346 as well as bypass cards 350. As shown in FIG. 3, bypass cards are referred to as BYPMP cards, to indicate that they are modified over the BYPP cards shown in FIG. 2. Nonetheless, in some embodiments of the invention, the system shown in FIG. 3 will support both BYPP cards and BYPMP cards, as well as other test cards.

One distinction between BYPP cards and BYPMP cards relates to calibration of the cards. BYPP cards require to be calibrated as a set. In other words, no calibration will occur until a pair of BYPP cards have a "nailed-up" cross-connection between them. In contrast, BYPMP cards require do not require a companion BYPMP card for calibration—each BYPMP card can calibrate itself To do so, BYPMP cards calibrate various parameters to zero or ground. In one embodiment BYPMP cards are physically identical to BYPP cards in terms of hardware, varying only in terms of software and/or firmware.

Figure 3A:
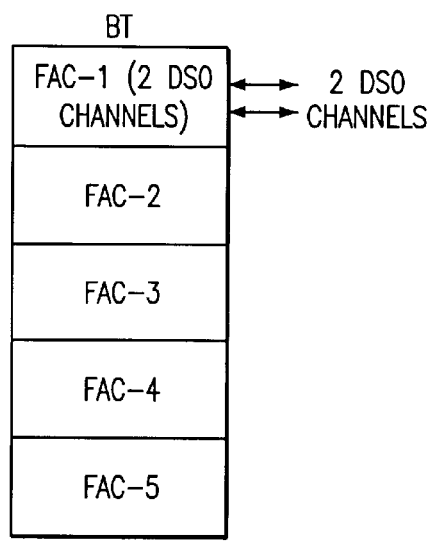
FIG. 3a is a generalized block diagram of a BT in accordance with the invention.

COT 340 is further distinct from that shown in FIG. 2. In particular, common control unit 342 includes a bypass pair terminator unit (BT) 352. BT 352 in one embodiment of the invention is a "logical terminator" implemented primarily in software and/or firmware. BT 352 is composed of a number of facilities, where a facility is a logical grouping of DS0 channels. Each BT facility is composed of two DS0 channels. The number of facilities contained in the BT generally corresponds to the number N of RTs $318_n$ that can be supported by the COT. Therefore, if 5 RTs can be supported by the COT, as in one embodiment of the invention, the BT should be designed to include 5 facilities. Alternatively, if in another embodiment of the invention the COT can support 15 RTs, the BT should be designed to include 15 facilities. A block diagram of a BT is shown in FIG. 3a.

Each RT unit $318_n$ is similar in many respects to COT 340. For instance, each RT unit 318 includes common control unit 360, including a BT 352. Each RT includes a number (K, P) of card banks, where in one embodiment K, P≦9. As shown in FIG. 3, RT-1 $318_1$ includes one channel bank 362, while RT-N $318_N$ includes one channel bank $362_{N1}$ and one fiber bank $362_{N2}$. Each channel bank houses various line cards including BYPMP and POTS cards, and each fiber bank includes fiber cards, each of which can be coupled to an ONU 370. In one embodiment each fiber bank can support up to 16 ONUs.

The BT 352 in each RT $318_n$ is structured similarly, in one embodiment of the invention, to the BT in the COT 340. In other words, if the BT in the COT has 5 facilities, so will the BT in the RT. However, at each RT, only FAC-1 of the BT 352 is utilized. Thus, the BTs in the RTs are structured the same as that in the COT for programming convenience only.

In accordance with one embodiment of the invention, each set of channel banks in each RT and each ONU will receive a BYPMP card. However, only one BYPMP card is required at the COT. In other words, BYPMP cards do not need to be deployed in pairs in accordance with the invention. Cross-connections between the BYPMP at the COT and those at the RTs and/or ONUs are not "nailed up," but will be dynamically established at the time the test is initiated. The BYPMP card 350 at the COT is, however, connected to a bypass pair 334.

Rather than establishing "nailed-up" cross-connections between the bypass cards themselves, a system in accordance with the invention need only establish one pre-provisioned nailed-up connection (i.e., two DS0 channels) across the fiber path for each RT, where BTs at the respective nodes serve as termination points for the respective pre-provisioned connection instead of the bypass cards. Such pre-provisioning may occur, for example, at system or node initialization.

To pre-provision, or reserve, a connection for each RT node, individual facilities in the COT's BT each respectively form a connection to an individual facility in a BT at a respective RT. In fact, the facilities in the COT's BT are dedicated to a particular RT unit in one embodiment, for example, facility-3 in the COT's BT (COT-BT1-FAC3) is dedicated to supporting test connections with RT-3. (Facilities will generally be referred to by node (e.g., COT, RT-1), BT number, and facility number, i.e., NODE-BT#-FAC#.) In other words, pre-provisioned cross-connects to the COT's BT will terminate on the facility number in the COT's BT corresponding to the RT node to which it is connected.

While the BT may be designed to include a given number of facilities, e.g., 5, not all facilities need to be used: for instance, if only 3 RTs are actually coupled to a COT which can support 5 RTs (and thus 5 facilities will be provided in the BT at the COT), then facility 4 (FAC-4) and facility 5 (FAC-5) would be unused.

Although pre-provisioned cross-connects are formed between the BT at the COT and a BT in each respective RT, respective facilities at each node (e.g., COT and RTs) are connected to the BYPMP cards to form a test path only when a test is to be performed. For instance, referring to FIG. 4, connection 474 is pre-provisioned, forming a connection from COT-BT1-FAC2 to RT2-BT1-FAC1. (Note that facilities 2–5 are unused in the RT.) If it is desired to test a drop from a channel bank in RT-2, after some initial signals are sent to RT-2 318$_2$ to indicate testing is desired (as is known in the art), then the channel bank 362$_{21}$ under test will dynamically establish a connection between its BYPMP card 350 and RT2-BT1-FAC1 (if idle). RT-2 then notifies the COT 340 that it is ready for test by sending a message including its RT number, e.g., RT-2, along with other information discussed in more detail below. The COT then dynamically connects an idle BYPMP card in one of its channel banks to the BT (if idle) in the COT's common control 342. Since the COT indexes into the BT facilities based upon the RT node, when testing RT-2, the COT will form a connection from COT-BT1-FAC2 to the BYPMP card 350 in the COT channel bank 344$_1$. Once a connection is formed from the COT-BT1-FAC2 to the BYPMP card, a dynamic cross-connection for testing is established. In FIG. 3, such a dynamic cross-connection is represented by dashed lines 375, where the connection represented by line 374 was pre-established and the connections represented by lines 375 were dynamically established. After a test is completed the connections between the respective BYPMP cards and BTs can be torn down.

Although only one BYPMP card and one BT are shown in the COT in FIGS. 3 and 4, more than one BYPMP card and/or BT can be provided in other embodiments. However, it is not necessary to provide a BYPMP card at the COT for each BYPMP card provided at the RT, including ONUs. Each BT and each BYPMP card in the COT is assigned for use for test purposes on an as-needed basis, i.e., only when a message is received from an RT indicating that it is ready for test. Thus, BYPMP cards in the COT can form test connections with any of a plurality of BYPMP cards located at the RTs and can do so using only the pre-provisioned connections between the BTs at respective nodes.

If more than one bypass pair 334 is provided, each BYPMP in the COT may be specifically assigned to a bypass pair 334. For instance, if two bypass pairs are provided from the switch 312, then two BYPMP cards could also be provided in the COT, where each card is coupled to a respective bypass pair. In some embodiments of the invention, some BYPMP cards can be coupled to both bypass pairs 334.

Additional BTs 352 can also be provided in each RT 318$_n$. Still, each set of channel banks 362$_k$ and each ONU 370$_q$ need only receive a single BYPMP card 350.

Referring now to FIG. 5, a test of two separate RTs 318$_n$ can be performed simultaneously if more than one BYPMP card 350 is provided at the COT 340 (where each BYPMP card 350 at the COT 340 is connected to a different bypass pair 334 provided from the LDS 312). As shown in FIG. 5, when a cross-connection is established dynamically, the BYPMP 350 in the channel bank in 362$_{11}$ in RT1 is connected to RT1-BT1-FAC1. A pre-provisioned connection will have previously been established between RT1-BT1-FAC1 and COT-BT1-FAC1. COT-BT1-FAC1 will be connected to a BYPMP card 350 in the COT. For RT-2 to be tested simultaneously, the BYPMP card in channel bank 362$_{21}$ is connected to RT2-BT1-FAC1. A test connection for testing drops from RT-2 is dynamically established when the COT couples COT-BT1-FAC2 to a BYPMP card distinct from the BYPMP card already supporting the testing of RT-1.

As mentioned above, in some embodiments of the invention more than one BT can be provided, and in some embodiments up to four BTs are provided (although more BTs could be provided in other embodiments). When more than one BT is provided at both the COT and the RT under test, two tests can be run for a single RT simultaneously. For instance, referring to FIG. 6, if two channel banks are used in RT-3 318$_3$, and a BYPMP card is provided in each, then tests of drops from both channel banks can be run. As shown in FIG. 6, the BYPMP of the first channel bank 362$_{31}$ would be coupled to RT3-BT1-FAC1. The BYPMP card in the second channel bank 362$_{32}$ would be coupled to RT3-BT2-FAC1. Pre-provisioned connections are also formed between BTs of the same number. In other words, pre-provisioned cross-connections are established for each set of BTs used. Therefore, in FIG. 6, RT3-BT1-FAC1 is connected to COT-BT1-FAC3 while RT3-BT2-FAC1 is connected to COT-BT2-FAC3. Each BT at the COT is then respectively dynamically coupled to a distinct BYPMP card to carry out each respective test simultaneously.

Figure 3B:
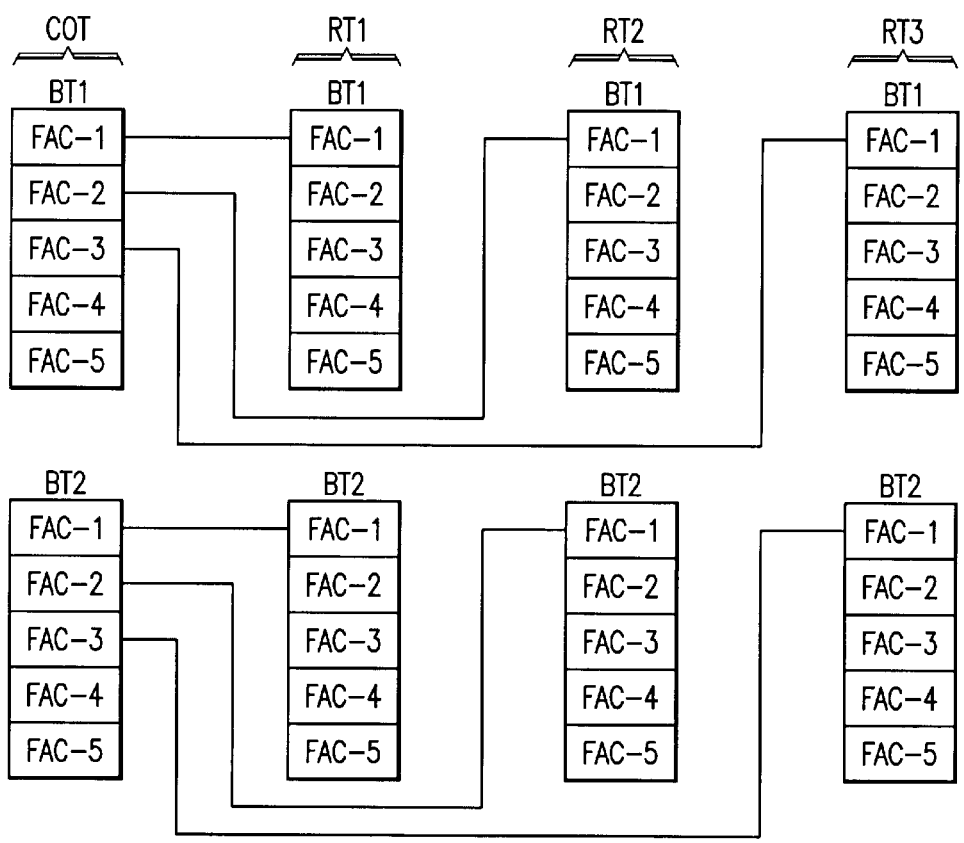
FIG. 3b is a generalized block diagram showing pre-provisioned connections in accordance with the invention.

FIG. 3b shows pre-provisioned cross-connects for a system that includes three RTs (although 5 RTs can be supported) and includes two BTs in each node. Each BT facility shown in FIG. 3b can generally be connected to any BYPMP card in its respective node.

As should be clear from the above description, no permanently "nailed-up" cross-connections to the bypass cards themselves need be established with a system in accordance with the invention. Rather, cross-connections between the bypass cards are established dynamically on an as-needed basis, reducing the demands on system resources, particularly reducing the number of slots at the COT required for testing as well as maximizing the bandwidth over the fiber path available for subscriber services when no test is being conducted.

Various data structures are used to support the system of dynamic cross-connections in accordance with the invention. In particular, data structures are used to implement BTs and data structures are used to keep track of BYPMP cards at each node.

First, a data structure is used for each BT such as data structure 700 shown in FIG. 7. The data structure 700 includes, for each facility of the BT, state information (e.g., in use, out of service, etc.), as well as cross-connect information (e.g., the physical port address used for the connection).

In addition, data structures are maintained to monitor each BYPMP card. At each node a table is kept by common control 342, 360 that includes a record of each BYPMP card in the node as shown in FIG. 8. The table 800 enables the quick location of available BYPMP cards when a test is initiated. The record 850 for each card includes a slot number where the card is housed, the card type, e.g., BYPP, BYPMP, or other test card type (for embodiments of the invention that support multiple types of cards), the bypass pair to which the card expects to be coupled (e.g., pair number one, pair number two, or either pair from the LDS), the far address, and the BT destination location. The far address includes the node, slot, facility, and channel for the node to which the BYPMP is coupled. The BT destination location includes cross-connect information (e.g., the physical port address used for the connection in the respective node). If the BYPMP is not in use, its record reflects in the far address and BT destination location fields that these fields are not assigned. Whenever a bypass card is added to or deleted from a slot, an appropriate entry is made/updated in the table for the respective node. Thus, unlike many currently available systems, a system in accordance with the invention does not require bypass cards to be housed in specific slots nor does it require that a user manually input bypass card information in a user table. Rather, a system in accordance with the invention automatically maintains this information.

More particularly and referring to FIG. 10, when establishing a test, a test indication signal is first sent from the CO to the RT to indicate that a test will be performed as is known in the art, step 1002. When the RT receives the test signal, a message will be sent to common control 360, which examines the RT's dynamic card table 800 (shown in FIG. 8) to locate a BYPMP supporting the bank under test, step 1004. If an idle BYPMP card is found, the RT's dynamic table is updated (e.g., in the far address and destination location fields), step 1006, and a connection will be established to an idle BT in the RT, step 1008. (If no idle BYPMP card or no idle BT is found, then no path can be established and the test will fail).

Once a connection to the BT is established from the BYPMP in the RT, the RT sends a message to the COT indicating the bypass card type and the BT number used, step 1010. The message structure is shown in FIG. 9 as MltBypConcMsg (MLT Bypass Concentration Message). The message includes:
 a message identifier, MsgId, including the message number and/or type;
 a "far address", which identifies the message sender by node, slot, facility, and channel ("far address" information is useful for correlating messages when multiple tests are simultaneously taking place);
 a "BT number", indicating to the message recipient (e.g., the COT) the BT number that the RT is using;
 a "bypass card type", indicating, for embodiments that support both BYPP, BYPMP, or other test cards, what type of card is being used;
 "Bypass pair number" indicates which bypass pair is expected to be used, e.g., bypass pair 1 or bypass pair 2 from switch 312 (Some embodiments of the invention may support more bypass pairs);
 "Connect" is Boolean value, which if true indicates that the connection is being put up, and if false that the connection is being taken down.

When a COT receives the message as shown in FIG. 9, it examines its dynamic card table 800 to find a compatible bypass card provisioned for the bypass pair indicated in the message, step 1012. When it finds an idle BYPMP card coupled to the appropriate bypass pair, the COT updates its card table, step 1014. The COT dynamically establishes a connection from the selected BYPMP card to a BT having the same number indicated in the message and to the facility specifically provisioned for the RT, step 1016. A dynamic cross-connection is then established between the BYPMP card via the appropriate BT specified in the message and the test path is complete. After performing testing, step 1018, an additional message, such as that shown in FIG. 9, will be sent to tear down the connections from the respective BYPMP cards to the respective BTs, step 1020.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A telecommunications system, comprising:
 a central office terminal, including a first test card;
 a remote terminal coupled to said central office terminal via an optical fiber path, said remote terminal including a second test card, said first test card and said second test card for testing a drop from said remote terminal;
 means for dynamically establishing a test connection between said first test card and said second test card upon initiation of a test, wherein said test connection was previously unestablished;
 wherein said means for dynamically establishing a test connection comprises:
  a second terminator at said remote terminal;
  wherein upon initiation of said test, a connection is established between said second test card and said second terminator, and wherein prior to initiation of said test, said connection was unestablished.

2. The telecommunications system of claim 1, wherein said means for dynamically establishing a test connection further comprises:
 a first terminator at said central office terminal;
 wherein upon initiation of said test, a connection is established between said first test card and said first terminator, and wherein prior to initiation of said test, said connection was unestablished.

3. The telecommunications system of claim 2, wherein said first terminator includes a plurality of facilities and said second terminator includes at least one facility, where each facility supports two DS0 channels.

4. The telecommunications system of claim 1, wherein said remote terminal includes a number X of test cards, where X is a positive integer value, and said central office terminal includes a number Y of test cards, where Y is a positive integer value, wherein X is greater than Y.

5. A telecommunications system, comprising:
 a central office terminal;
 at least one remote terminal coupled to said central office terminal via at least one optical fiber path;
 a first bypass card included in said central office terminal;
 a plurality of bypass cards included in said at least one remote terminal;
 said first bypass card at said central office terminal capable of forming a test connection with any of said plurality of bypass cards at said remote terminal, wherein said test connection is dynamically formed upon initiation of a test.

6. The telecommunications system of claim 5, wherein said central office terminal includes a first bypass pair terminator and said at least one remote terminal includes a second bypass pair terminator, said system further including a pre-provisioned connection between said first bypass pair terminator and said second bypass pair terminator, and wherein upon initiation of a test, a connection is formed from said first bypass card to said first bypass pair terminator and a connection is formed from one of said plurality of bypass cards to said second bypass pair terminator, thereby forming said test connection.

7. The telecommunications system of claim 6, wherein said central office terminal and said at least one remote terminal each include a plurality of bypass pair terminators.

8. The telecommunications system of claim 5, wherein at least some of said plurality of bypass cards included in said at least one remote terminal are located in an optical network unit coupled to said remote terminal.

9. The telecommunications system of claim 5, wherein said at least one remote terminal includes a number X of bypass pair cards, where X is a positive integer value, and said central office terminal includes a number Y of bypass pair cards, where Y is a positive integer value, wherein X is greater than Y.

10. The telecommunications system of claim 9, including a plurality of remote terminals, wherein at least one of said remote terminals is coupled to an optical network unit.

11. The telecommunications system of claim 5, wherein said central office terminal includes a plurality of bypass pair cards and said central office terminal maintains a dynamic card table in which information relating to said plurality of bypass cards is automatically stored by said central office terminal.

12. A telecommunications system, comprising:
   a central office terminal, including
      a first bypass card, and
      a first bypass pair terminator;
   a plurality of remote terminals coupled to said central office terminal each via a respective optical fiber path, each of said remote terminals including
      a second bypass card, and
      a second bypass pair terminator;
   a pre-provisioned connection, for each of said remote terminals, from said first bypass pair terminator, through said respective optical fiber path, to said respective second bypass pair terminator;
   said first bypass card capable of forming part of a test connection with any of said second bypass cards at said plurality of remote terminals, wherein said test connection is dynamically formed upon initiation of a test by a connection formed from said first bypass card to said first bypass pair terminator and, in a respective remote terminal, a second connection is formed from said second bypass card to said second bypass pair terminator.

13. A first node for use in a telecommunications system including a second node coupled to said first node via an optical fiber path, wherein said first node is one of a central office terminal and a remote terminal, said first node comprising:
   a first bypass pair card;
   a first bypass pair terminator;
   said first bypass pair terminator capable of forming a connection with said first bypass pair card upon initiation of a test, where said connection is previously unestablished, said first bypass pair terminator including at least one facility and capable of reserving a pre-provisioned connection from said first node to said second node prior to said initiation of said test.

14. The first node of claim 13, further including a plurality of bypass pair cards, and a dynamic card table in which information relating to said plurality of bypass cards is automatically stored by said central office terminal.

15. A method of testing a drop coupled to a remote terminal, where said remote terminal is connected to a central office terminal via an optical fiber path, comprising the steps of:
   providing telecommunications service over said optical fiber path;
   initiating a test of said drop;
   dynamically establishing a test connection between a bypass card at said central office terminal and a bypass card at said remote terminal after said step of initiating said test;
   wherein the step of dynamically establishing a test connection between said central office terminal and said remote terminal, comprises the step of:
      establishing a connection from said bypass card at said remote terminal to a bypass pair terminator at said remote terminal.

16. The method of claim 15, wherein the step of dynamically establishing a test connection between said central office terminal and said remote terminal, further comprises the steps of:
   sending a test-ready message to said central office terminal;
   establishing a connection from said bypass card at said central office terminal to a bypass pair terminator at said central office terminal.

17. The method of claim 16, further including, prior to said step of establishing a connection from said bypass card at said central office terminal to a bypass pair terminator at said central office terminal, the step of:
   searching a dynamic card table maintained by the central office terminal to locate and select an available bypass card in the central office terminal; and
   updating said dynamic card table maintained by the central office terminal with test connection information.

18. The method of claim 17, further including, prior to said step of establishing a connection from said bypass card at said remote terminal to a bypass pair terminator at said remote terminal, the step of:
   searching a dynamic card table maintained by the remote terminal to locate and select an available bypass card in the remote terminal; and
   updating said dynamic card table maintained by the remote terminal with test connection information.

19. The method of claim 16, wherein each bypass pair terminator includes a plurality of facilities and wherein:
   establishing a connection from said bypass card at said remote terminal to a bypass pair terminator at said remote terminal includes establishing a connection to a facility in said bypass pair terminator at said remote terminal;
   establishing a connection from said bypass card at said central office terminal to a bypass pair terminator at said central office terminal includes establishing a connection to a facility in said bypass pair terminator at said central office terminal.

20. The method of claim 16, further including the step of:
   pre-provisioning a test connection from the bypass pair terminator in said central office terminal to said bypass pair terminator in said remote terminal, prior to said step of initiating a test of said drop.

* * * * *